United States Patent [19]

Fishman

[11] 3,990,410
[45] Nov. 9, 1976

[54] ROTARY ENGINE WITH ROTARY VALVE

[76] Inventor: Ehud Fishman, c/o Zimamon, 3341-C Raleigh St., Hollywood, Fla. 33021

[22] Filed: Apr. 21, 1975

[21] Appl. No.: 569,799

[52] U.S. Cl. .............................. 123/8.47; 418/196
[51] Int. Cl.² ..................... F02B 55/14; F01C 1/24; F04C 29/08
[58] Field of Search .................... 418/196; 123/8.47

[56] References Cited
UNITED STATES PATENTS

| | | | |
|---|---|---|---|
| 1,349,882 | 8/1920 | Homan | 123/8.47 |
| 1,874,239 | 8/1932 | Cannizzaro | 418/196 X |
| 2,097,881 | 11/1937 | Hopkins | 123/8.47 X |
| 3,234,888 | 2/1966 | Wise et al. | 418/196 |
| 3,439,654 | 4/1969 | Campell, Jr. | 123/8.47 X |
| 3,799,126 | 3/1974 | Park | 418/196 X |
| 3,809,026 | 5/1974 | Snyder | 123/8.47 |

FOREIGN PATENTS OR APPLICATIONS

| | | | |
|---|---|---|---|
| 1,320,991 | 2/1963 | France | 418/196 |
| 1,576,899 | 7/1970 | Germany | 123/8.47 |
| 281,612 | 1/1931 | Italy | 418/196 |
| 36,923 | 11/1935 | Netherlands | 418/196 |

*Primary Examiner*—C. J. Husar
*Assistant Examiner*—Leonard Smith
*Attorney, Agent, or Firm*—Ernest H. Schmidt

[57] ABSTRACT

A rotary four-cycle internal combustion engine having an expansible combustion chamber defined by three identical rotors of generally triangular cross-sectional shape journalled for cooperative rotation about parallel axis and so arranged in peripheral line contact with one another as to sequentially expand and contract the combustion chamber as the rotors rotate in unison as controlled by gearing. The rotors are journalled within a cylindrical housing structure comprising inner opposed end walls between which the rotors extend to define the ends of the central combustion chamber. A rotary valve mechanism communicating through one of the opposed end walls and geared in timed sequence with the rotors, provides for discharge of the gasses of combustion and the intake of gaseous fuel during respective exhaust and intake phases of operation, while at the same time serving as a power output shaft.

11 Claims, 8 Drawing Figures

ROTARY ENGINE WITH ROTARY VALVE

This invention relates to internal combustion engines, and is directed particularly to improvements in rotary internal combustion engines.

The principal object of this invention is to provide a rotary internal combustion engine which will be of utmost simplicity as compared with rotary engines heretofore devised, while at the same time achieving unusually high power output to engine weight, and power engine to overall engine size, ratios.

A more particular object of the invention is to provide a rotary four-cycle combustion engine wherein the combustion chamber is defined by three identical rotors of generally triangular cross-sectional shape journalled for cooperative rotation about parallel axes and so arranged in peripheral line contact with one another as to sequentially expand and contract the central combustion chamber as the rotors rotate in unison within a cylindrical housing structure comprising inner opposed end walls between which the rotors extend to define the ends of said central combustion chamber.

A more particular object of the invention is to provide a rotary engine of the character described including exhaust gas and gaseous fuel intake ports, and combination rotary output shaft and valve means communicating with the combustion chamber and geared in timed rotative sequence with the rotors to provide for discharge of the gasses of combustion and the intake of gaseous fuel during respective exhaust and intake phases of operation of the motor.

Yet another object of the invention is to provide a rotary internal combustion engine of the above nature which is particularly well suited to doubling, tripling, etc. of power outlet simply by the addition of extra rotors to the basic three-rotor configuration, which additional rotors each define an additional combustion chamber together with side-wall surface portions of adjacent cooperative rotors.

Other features, objects and advantages of the invention will be apparent from the following description when read with reference to the accompanying drawings.

In the drawings, wherein like reference numerals denote corresponding parts throughout the several views.

Figure 1:
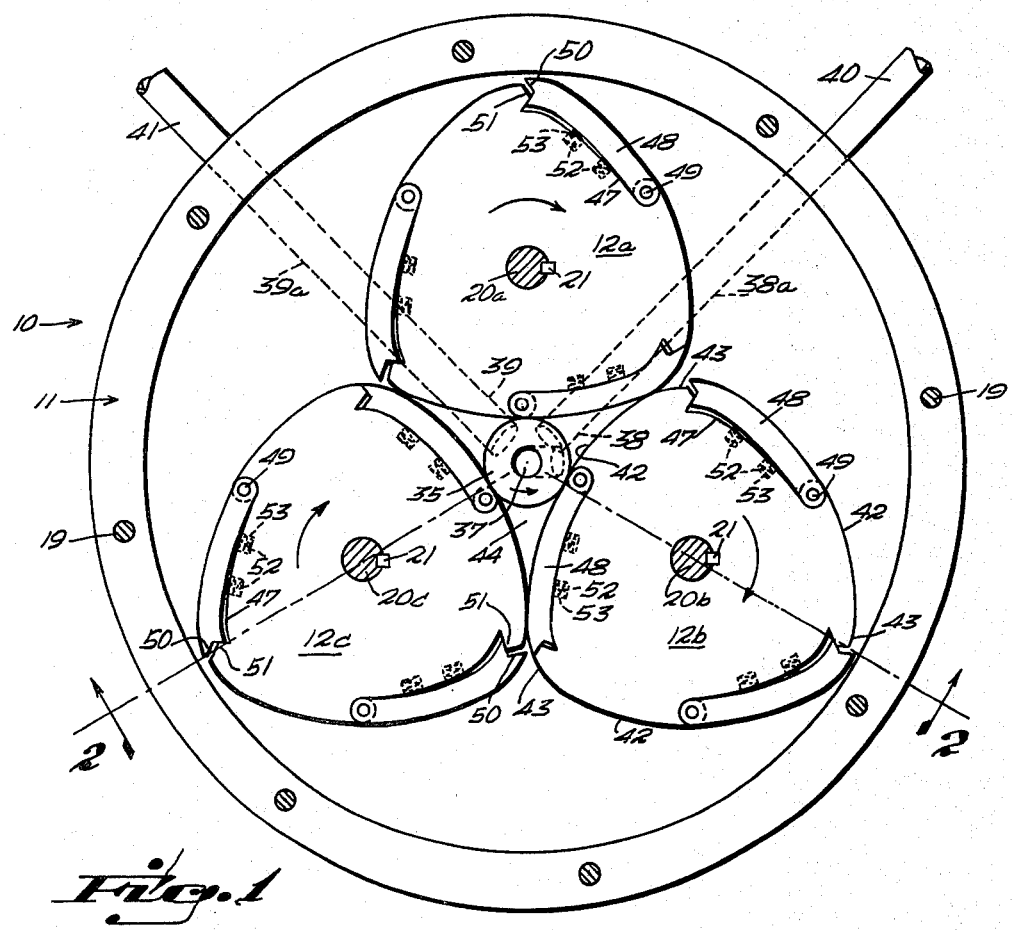
FIG. 1 is a transverse cross-sectional view of a rotary engine embodying the invention, taken along the line 1—1 of FIG. 2 in the direction of the arrows and illustrating the multiple rotor housing and the relative disposition of the three cooperative rotors therein as seen from one end of the housing.
Figure 5:
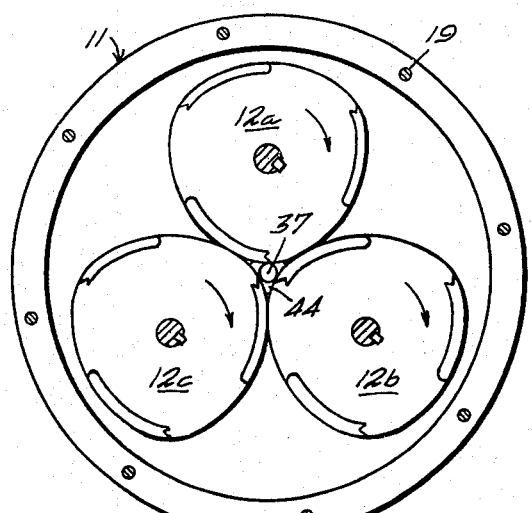
Figure 6:
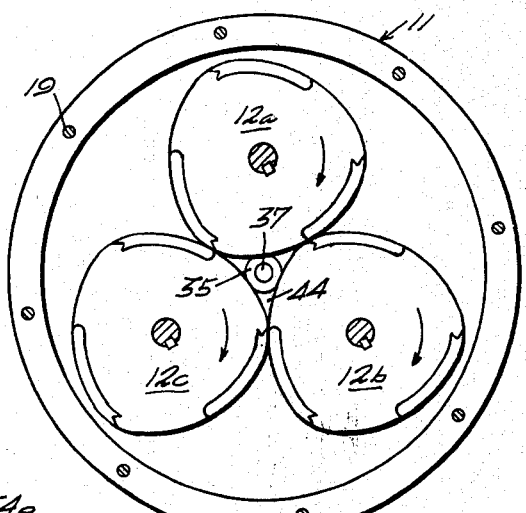
Figure 8:
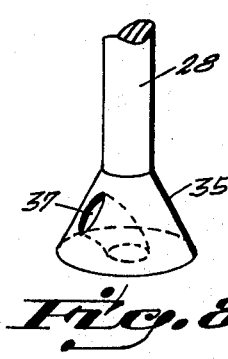
Figure 7:
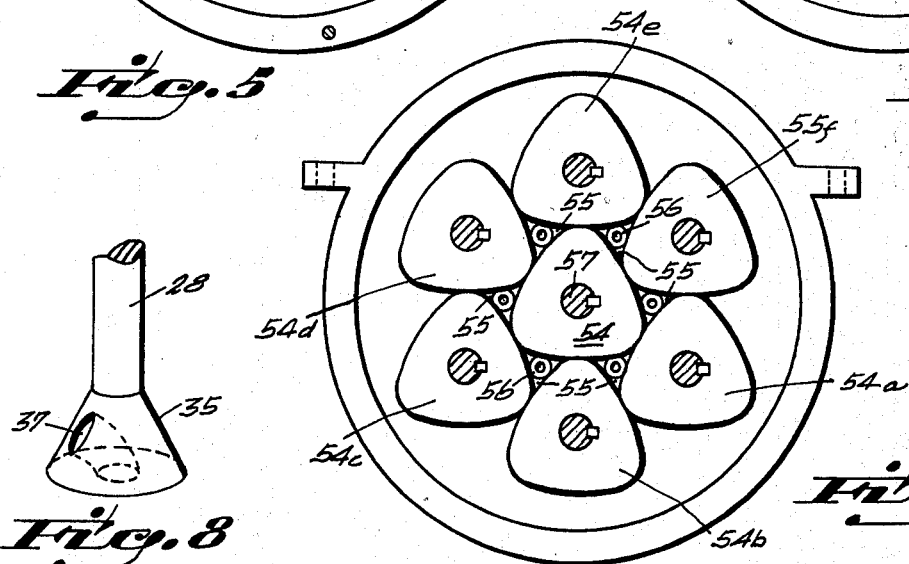

FIGS. 1, 4, 5, 6, and back to FIG. 1, illustrate, progressively, rotation of the three cooperative rotors from the fully expanded position immediately prior to ignition as illustrated in FIG. 1 through the compression state (FIG. 5) and then proceeding through FIG. 6 to the next successive expansion state, being the same configuration as illustrated in FIG. 1;

FIG. 7 is a cross-sectional view illustrating schematically, how the three rotor concept as illustrated in FIG. 1 through 6, can be expanded by the addition of a multiplicity of like rotors in cooperative disposition for correspondingly multiplying power output, and;

FIG. 8 is an oblique view of the frusto-conical valve head portion of the drive shaft, shown separately and on an enlarged scale.

Figure 2:
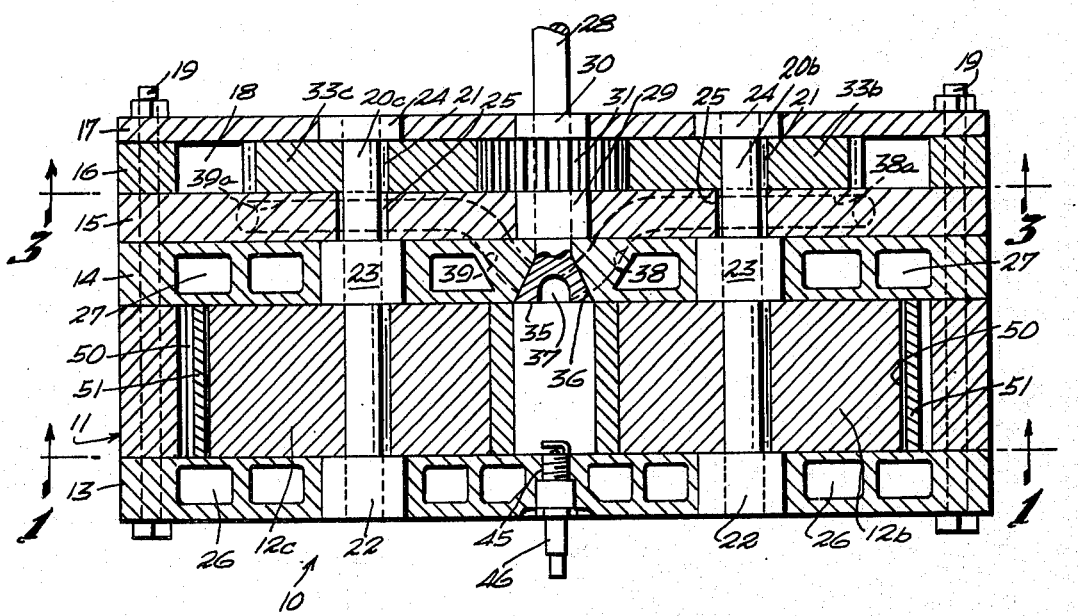
FIG. 2 is a vertical cross-sectional view taken along the radially-extending lines 2—2 of FIG. 1 in the direction of the arrows and illustrating constructional details of the invention.

Referring now to FIGS. 1 and 2 of the drawings, reference numeral 10 designates, generally, a preferred form of a basic single combustion chamber rotary engine embodying my invention, said engine comprising a cylindrical rotor housing or block 11, a plurality of rotor members 12a, 12b and 12c symmetrically arranged for cooperative rotation about parallel axes within and about the central axis of said cylindrical housing in the manner hereinafter more particularly described, circular end plate members 13, 14 secured in clamped relation against the ends of said rotor housing member, an intake and exhaust port plate 15 secured in concentric relation against the outside of the end plate member 14, an annular spacer ring 16 secured in concentric relation against the outside of said intake and exhaust port plate, and a circular outer end plate 17, concentrically secured against the outside of said spacer ring. The space between the exhaust port plate 15 and the outer end plate 17 defines a cylindrical recess 18 which houses gearing constraining the rotor members 12a, 12b and 12c to rotation in unison in the manner and for the purpose hereinafter more particularly described.

A plurality of bolts 19 extending through marginal edge portions of the engine housing assembly, equidistantly spaced thereabout, serve to retain the structure in interclamped relation.

As further illustrated in FIGS. 1 and 2, the rotor members 12a, 12b and 12c are carried by axial shafts 20a, 20b and 20c, respectively, keyed thereto as by keybars 21. The axial shafts 20a, 20b and 20c extend through their respective rotor members 12a, 12b and 12c and are journalled equidistantly about the center of the assembly and equidistantly spaced thereabout by 120 circular degrees. As best illustrated in FIG. 2, the axial shafts are journalled in bearings 22, 23 and 24 fitted in the circular end plate member 13, the circular end plate member 14 and the circular outer end plate 17, respectively. Through openings 25 provided in the intake and exhaust port plate 15 permit free passage of the individual rotor shafts 20a, 20b and 20c (only two openings 25 being illustrated in FIG. 2).

The housing end plate members 13, 14 are each provided with a plurality of internal passageway 26, 27, respectively, for circulation of a coolant, such as water, or air, in the manner of ordinary four-cycle reciprocating piston engine blocks. Since various techniques for the circulation of a coolant through or about internal combustion engine housing structures to prevent overheating are known and comprise no significant feature of this invention, it is not deemed necessary to describe the method or means of engine cooling in greater detail herein, whether by water or other liquid coolant, or forced air cooling or any other appropriate method of engine cooling, if required.

Figure 3:
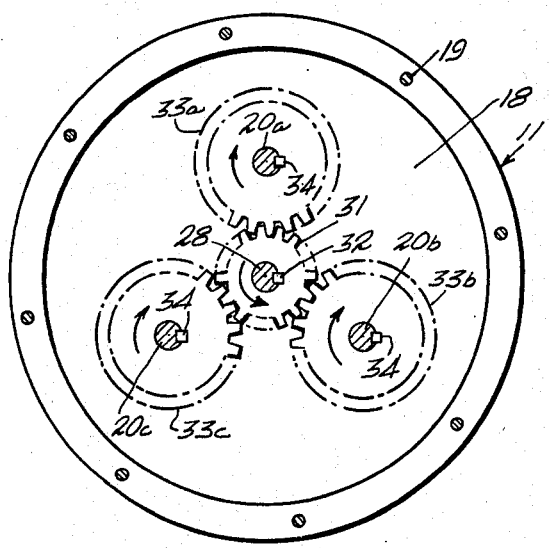
FIG. 3 is a transverse cross-sectional view taken along the line 3—3 of FIG. 2 in the direction of the arrows and illustrating the gear mechanism operative to maintain the rotors in synchronization.
Figure 4:
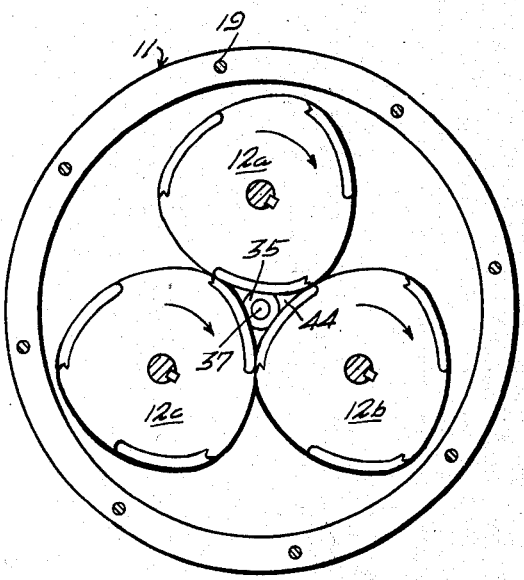

As best illustrated in FIGS. 2 and 3, a central or axial drive or output shaft 28 is journalled in central bearings 29, 30 fitted in the intake and exhaust port plate 15 and the circular outer end plate 17, respectively. As illustrated in FIG. 3, the drive shaft 28 at that portion thereof within the cylindrical recess 18 carries a common drive gear 31, keyed thereto as by keybar 32, in mesh with identical rotor member gears 33a, 33b, and 33c, respectively, keyed to respective rotor shafts 20a, 20b and 20c as by keybars 34. The ratio of the identical rotor member gears 33a, 33b and 33c to the common drive gear 31, is 1½ to 1, so that each time said common drive gear makes a full turn through 360 circular degrees, the rotor member gears, and consequently their associated rotor members 12a, 12b and 12c, will turn through two thirds of a complete circle, or through 240 circular degrees.

The inner end of the drive or output shaft 28, as illustrated in FIGS. 2 and 8, carries a frusto-conical valve head portion 35 fitted within a complementary frusto-conical valve seat 36 provided at the inside of the circular end plate member 14 (FIG. 2). The valve head 35 is formed with a radially-extending port opening 37 (see FIG. 8) through the outside center of said valve head and adapted to communicate, successively, during rotation of output shaft 28, with exhaust port passageway 38 and intake port passageway 39 formed in the end plate member 14. The exhaust and intake ports are angularly spaced by 90 circular degrees, as illustrated in FIG. 1. The intake and exhaust port plate 15 is provided with exhaust and intake port continuation passageways 38a, 39a, respectively, communicating at their inner ends with respective exhaust and intake port passageways 38, 39 and terminating in externally-extending exhaust and intake conduits 40, 41, respectively. The intake port serves to supply carbureted gasoline, as in the case of the standard internal combustion engine, or air as in the case of those engines employing fuel injection of gaseous fuels, such, for example, as gasoline or diesel fuel; and the exhaust port serves to exhaust the products of combustion thereof during operation of the engine in the manner hereinafter more particularly described.

As illustrated in FIG. 1 the rotor members 12a, 12b, 12c are generally in the shape of equilateral triangular prisms with convexly-rounded sides and apices, side portions 42 and apices 43 of said rotors being so relatively disposed within the rotor housing block 11 as to maintain line contact with one another as they rotate in unison about their respective shafts 20a, 20b and 20c in the clockwise directions as indicated by the arrows. As illustrated in FIG. 2, the rotor members 12a, 12b, 12c extend fully between the opposed, flat inner wall surfaces of the circular end plate members 13, 14, so that the facing side wall portions of said rotor members between their vertical lines of contact define, together with the facing side wall portions of plates 13 and 14, a combustion chamber 44 changing in volume between the maximum volume condition as illustrated in FIG. 1 and the minimum volume condition as illustrated in FIG. 5 as said rotors turn in unison through 60 circular degrees which, as hereinabove described, is equivalent to a ¼ or 90 circular degree turn of the drive or output shaft 28.

As illustrated in FIG. 2, the circular end plate member 13 is provided with a tapped opening 45 for reception of an ordinary spark plug 46 for fuel ignition, (or an injector as in the case of the diesel cycle, for example) as hereinbelow more particularly described. The ignition system and the timing mechanism for the spark plug 46, being typical of such systems commonly employed in ordinary reciprocating piston internal combustion engines, is not illustrated or described herein in detail. For a full understanding of my invention, it is deemed sufficient to state that spark plug ignition will be timed with the rotation of the drive or output shaft 28 to provide for firing within the combustion chamber 44 each time the cycle is initiated.

Means is provided for minimizing the possibility of expansion gases leaking through the zones of line contact between adjacent pairs of the rotor members 12a, 12b and 12c due to wearing away, for example, of surface metal. To this end, lagging surface portions of the side portions 42 of each of the rotor members 12a, 12b, 12c are formed with recesses 47 extending lengthwise from one end to the other, i.e. between the inner surfaces of the end plates 13 and 14, fitted with coextensive, conforming side-wall expansion members 48 which may be hinged at the leading ends thereof, as indicated at 49, and which are arranged for limited outward movement at their lagging ends by having an angular recess 50 therealong received in an angularly projecting tooth portion 51 formed at the lagging end of recess 47 of the rotor. The side-wall expansion members 48 are normally resiliently constrained in the outward direction to their limit positions as determined by the projecting tooth portions 51 such as by compression springs 52 seated within blind openings 53 within the side-wall expansion members 48 and abutting inner surface portions of said side-wall expansion members.

The side-wall expansion members 48 are of such peripheral extent about their respective rotor side portions 42, as illustrated in FIGS. 1, 4, 5 and 6 that no matter what the relative rotative disposition of said rotors during their cycles of operation, there will always be a side-wall expansion member 48 making line contact with a wall portion of an adjacent rotor member to minimize the possibility of gas leakage and friction. At no time during their cycles of operation will there be two side-wall expansion members 48 of adjacent rotor members in contact with one another, nor will there be contact between adjacent side portions 42.

Considering now the operation of the engine with reference first to FIG. 1 of the drawings, it will be seen that the rotor member 12a, 12b, 12c are in a position of maximum expansion of the combustion chamber 44 such as occurs at the completion of a power phase, as hereinafter particularly described. At this condition of rotary disposition of the rotor member 12a, 12b, 12d, as illustrated in FIG. 1, the valve portion 35 of the drive or output shaft 28 will have just placed the radially-extending port 37 thereof in communication with the exhaust port passageways 38 and 38a to permit discharge of the products of combustion through the exhaust conduit 40. Thereafter, the rotor members 12a, 12b, 12c will turn in unison, progressively as illustrated in FIGS. 1 through 4 and 5, i.e., through 60 circular degrees, whereupon the gases of the just previous combustion or power phase will have been discharged through the exhaust conduit 40. At this minimum volume position of the rotors, the drive or output shaft 28 will have turned through 90 circular degrees, sufficiently to close the above-described gas discharge passageway through the exhaust conduit 40, and just begin to open the radially-extending port 37 into communication with the inlet port passageways 39, 39a and intake conduit 41. During the next 60 circular degree phase of rotor operation, corresponding to the next ¼ turn or 90 circular degree turn of the output shaft 28, the rotor members 12a, 12b and 12c will turn through the rotative position as illustrated in FIG. 6, to maximum volume again in the combustion chamber 44, (see FIG. 1) during which time gaseous fuel will be sucked into the combustion chamber 44 through the intake conduit 41. Upon the completion of this 60 circular degree phase of rotor operation, the rotative position of the valve head member 35, having turned through the next 90 circular degree turn along with the output shaft 28, will be such as to seal off said combustion chamber during the next two 60 circular degree phases of operation of the rotor members, corresponding to the compression and power phases, successively.

At the completion of the compression phase, as illustrated in FIG. 5, the carborretted gasoline or other gaseous fuel, will be compressed to minimum volume. At this time, substantially at the end of the gaseous fuel compression stage, ignition will take place by means of the spark plug 46, which will be synchronously timed with the rotative position of the drive or output shaft 28, as hereinabove referred to. The explosive forces of the fuel ignition acting normal to the side portions 42 of each of the rotor members 12a, 12b and 12c, in the direction of rotation of said rotor members, provides torque, transmitted through gearing 33a, 33b, 33c and common gear 31, to the drive or output shaft 28. At the completion of this power phase, as described above, the rotors will each have turned through 240 circular degrees, and the drive or output shaft 28 together with its valve head 35 will have turned through 360 circular degrees, as controlled by the ratio between the identical rotor gear members 33a, 33b and 33c to the common drive gear 31 carried by the output shaft 28, this ratio being 1½ to 1 as hereinbefore described. Flywheel effect results in continued turning of the engine through the next successive exhaust discharge, fuel gas intake, and compression phases until just prior to ignition for the next successive power phase of the engine, as hereinbefore described. In this connection it will be noted that the turning of the rotors through 120 circular degrees as represented by successive positions thereof in FIGS. 1, 4, 5, 6 and returning to the configuration illustrated in FIG. 1 constitutes ½ cycle of engine operation, that is, through the exhaust and fuel intake phases, as described above. This corresponds to 180 circular degrees rotation of the output or drive shaft 28, so that one full turn of the output shaft corresponds to a full cycle of engine operation, which, in turn, as described above, is represented by turning of the individual rotors through 240 circular degrees.

As best illustrated in FIGS. 1 and 2, the apices of the rotor members 12a, 12b and 12c pass within a short distance of the inner peripheral wall of the cylindrical rotor housing block 11. The side portions 42 of said rotors, as they pass beyond their zones of contact of their adjacent, cooperating rotors may be lubricated in any appropriate manner, such as by spray injection or any other conventional method of lubrication.

FIG. 7 illustrates, generally, a modification of the invention wherein a plurality of rotors greater than three, such as rotors 54, 54a, 54b, 54c, 54d, 54e and 54f, can be used for augmenting power output of a rotary engine embodying the invention. Each rotor in addition to the basic three rotor configuration comprising rotors 54, 54a and 54b, for example, adds an additional combustion chamber, with the exception that the additional rotor completing a circle of rotors about a central rotor (rotor 54 in FIG. 7) adds two combustion chambers, to provide a further improved ratio of weight to engine power output in multiple combustion chamber configurations. In such configurations, it will be understood that each of the combustion chamber 55 will have its own valve head and shaft member 56 appropriately geared and timed for cooperative rotation with the rotors 54 and 54a through 54f, and that the central rotor shaft 57 will constitute the drive or output shaft of the engine.

While I have illustrated and described herein only two forms in which my rotary engine can conveniently be embodied in practice, it is to be understood that these forms are presented by example only and not in a limiting sense. The invention, in brief, comprises all the embodiments and modifications coming within the scope and spirit of the following claims.

What I claim as new and desire to secure by Letters Patent is:

1. An expansion chamber operable as a rotary combustion engine, in combination, a housing structure, said housing structure comprising a pair of end members having a pair of opposed inner wall surfaces defining therebetween a rotor chamber, three identical rotors of generally equilateral triangular cross-sectional shape, said cross-sectional shape being defined by identical convex arcuate sidewall portions and identical arcuate apex wall portions of comparatively lesser arcuate radius than said sidewall portions, each of said rotors being journalled for rotation about its central axis within said rotor chamber, the axes of rotation of said rotors extending normal to said rotor chamber inner wall surfaces and said rotors extending from one of said pair of opposed inner wall surfaces to the other, the axes of rotation of said rotors being so symmetrically spaced with respect to the transverse cross-sectional size of said rotors that each of said rotors is continuously in axially-extending line contact with each of the other of said rotors so as to define a central expansion chamber therebetween having a substantial minimum volume, and means for rotating said rotors in unison in the same direction and rate of speed to sequentially expand and contract said central expansion chamber, an intake port communicating through one of said end members, and an exhaust port communicating through one of said end members, each at a zone thereof comprising said expansion chamber, and valve means extending through said one of said end members and within said expansion chamber for sequentially communicating with said intake port and exhaust port during intake and exhaust phases of operation of said rotors, and means for actuating said valve means in timed sequence with the rotation of said rotors.

2. A rotary internal combustion engine as defined in claim 1 wherein said valve means comprises a frusto-conical valve seat in said one of said end members and a frusto-conical valve head rotatively received within said valve seat, said frusto-conical valve head being carried by a valve shaft having an axis of rotation parallel with the axes of rotation of said rotors, said means for rotating said rotors in unison and said means for actuating said valve means in timed sequence with the rotation of said rotors comprising an axial shaft for each of said rotors, and mechanical gearing interconnecting said axial rotor shafts, and said means for actuating said valve means comprising a spur gear carried by said valve shaft and mechanically interconnected with said rotor shaft gearing.

3. A rotary internal combustion engine as defined in claim 2, wherein lagging surface portions of each of the side portions of said rotor members are provided with laterally-expansible side-wall means operative to insure line contact between the rotors defining said combustion chamber during all relative rotative positions of said rotors.

4. The invention as defined in claim 2, including one or more additional rotors identical with said three rotors and correspondingly journalled within said rotor chamber, each of said additional rotors being in axially-extending line contact with at least two other of the rotors so as to define additional expansion chambers therebetween, said means for rotating said rotors in unison in the same direction and rate of speed to sequentially expand and contract said expansion chamber further comprising means for expanding and contracting said additional expansion chambers.

5. A plurality of expansion chambers as defined in claim 4 and operable as a rotary combustion engine, wherein one of said rotor journalling means comprises the power output shaft of the engine.

6. The invention as defined in claim 5 said additional rotors being of such quantity as to define, along with said first mentioned three rotors, a regular configuration having a central rotor about which the remaining rotors are symmetrically arranged, said central rotor journalling means comprising the power output shaft of the engine.

7. A rotary internal combustion engine as defined in claim 2, wherein said rotor shafts gearing comprises an individual spur gear carried by each of said rotor axial shafts and symmetrically arranged about said valve shaft spur gear and in mesh therewith.

8. A rotary internal combustion engine as defined in claim 7 wherein said valve shaft extends outwardly of said housing structure and constitutes the rotary output shaft of the engine.

9. A rotary internal combustion engine as defined in claim 7 wherein the ratio between said individual rotor spur gears and said valve shaft spur gear is 1½ to 1.

10. A rotary internal combustion engine as defined in claim 7 wherein said valve means further comprises an exhaust port passageway and an intake port passageway communicating with openings within the peripheral wall of said frusto-conical valve seat and being peripherally separated by 90 circular degrees, and wherein said valve head is formed with a radially-extending port opening through the outside center of said valve head and adapted to communicate, successively, during rotation of said valve shaft, with said exhaust port passageway and said intake port passageway.

11. A rotary internal combustion engine as defined in claim 7, including means for igniting gaseous fuel compressed in said combustion chamber in timed sequence with the operation of said rotors.

* * * * *